US012701163B2

(12) United States Patent
Piel et al.

(10) Patent No.: US 12,701,163 B2
(45) Date of Patent: Aug. 4, 2026

(54) COMPUTERIZED SYSTEMS AND METHODS FOR PROVIDING DEVICE-SPECIFIC CONFIGURATIONS TO HOST-CLIENT DEVICES

(71) Applicant: Resideo USA LLC, Golden Valley, MN (US)

(72) Inventors: Kevin Piel, Ronkonkoma, NY (US); Travis Read, Little Canada, MN (US); Pat Tessier, Maple Grove, MN (US); Ryan Thorsen, Fergus Falls, MN (US)

(73) Assignee: Resideo USA LLC, Golden Valley, MN (US)

( * ) Notice: Subject to any disclaimer, the term of this patent is extended or adjusted under 35 U.S.C. 154(b) by 32 days.

(21) Appl. No.: 18/738,591

(22) Filed: Jun. 10, 2024

(65) Prior Publication Data

US 2024/0422221 A1     Dec. 19, 2024

Related U.S. Application Data

(60) Provisional application No. 63/508,035, filed on Jun. 14, 2023.

(51) Int. Cl.
H04L 67/12          (2022.01)
(52) U.S. Cl.
CPC .................................. H04L 67/12 (2013.01)
(58) Field of Classification Search
CPC .......... H04L 67/12; H04L 67/51; H04L 69/24
See application file for complete search history.

(56) References Cited

U.S. PATENT DOCUMENTS

| | | | |
|---|---|---|---|
| 8,255,086 B2 | 8/2012 | Grohman | |
| 9,933,174 B2 * | 4/2018 | Mauk ...................... | F24F 11/63 |
| 10,371,400 B2 * | 8/2019 | Quam ..................... | H04L 67/12 |
| 10,533,761 B2 * | 1/2020 | Barton ..................... | F24F 11/38 |
| 11,193,692 B2 * | 12/2021 | Delgoshaei .............. | F24F 11/38 |
| 2010/0106315 A1 * | 4/2010 | Grohman ................ | F24F 11/30 |
| | | | 700/276 |
| 2024/0385228 A1 * | 11/2024 | Courtney ........... | G01R 19/2513 |

FOREIGN PATENT DOCUMENTS

| | | |
|---|---|---|
| IN | 330929 B | 1/2020 |
| WO | 2005015829 A1 | 2/2005 |

* cited by examiner

*Primary Examiner* — Brian T Misiura
(74) *Attorney, Agent, or Firm* — Greenberg Traurig LLP; Nicholas Martin; David J. Dykeman

(57)          ABSTRACT

Disclosed are systems and methods that provide a novel framework for setting a first mode for a controller connected to a set of devices at a location; disabling communication capabilities of the controller with the set of devices for the time period, detecting information indicating modification to the devices, the detected information being based on activities performed respective to the devices during the time period; modifying operation of the controller, the modified operation comprising changing from the first mode to a second mode, the second mode enabling capabilities for the controller to test capabilities of at least the portion of devices; and causing interactions between the controller and each of the portion of devices in accordance with the second mode, the interactions involving executing the capabilities of the portion of devices and determining each capabilities status.

20 Claims, 6 Drawing Sheets

300

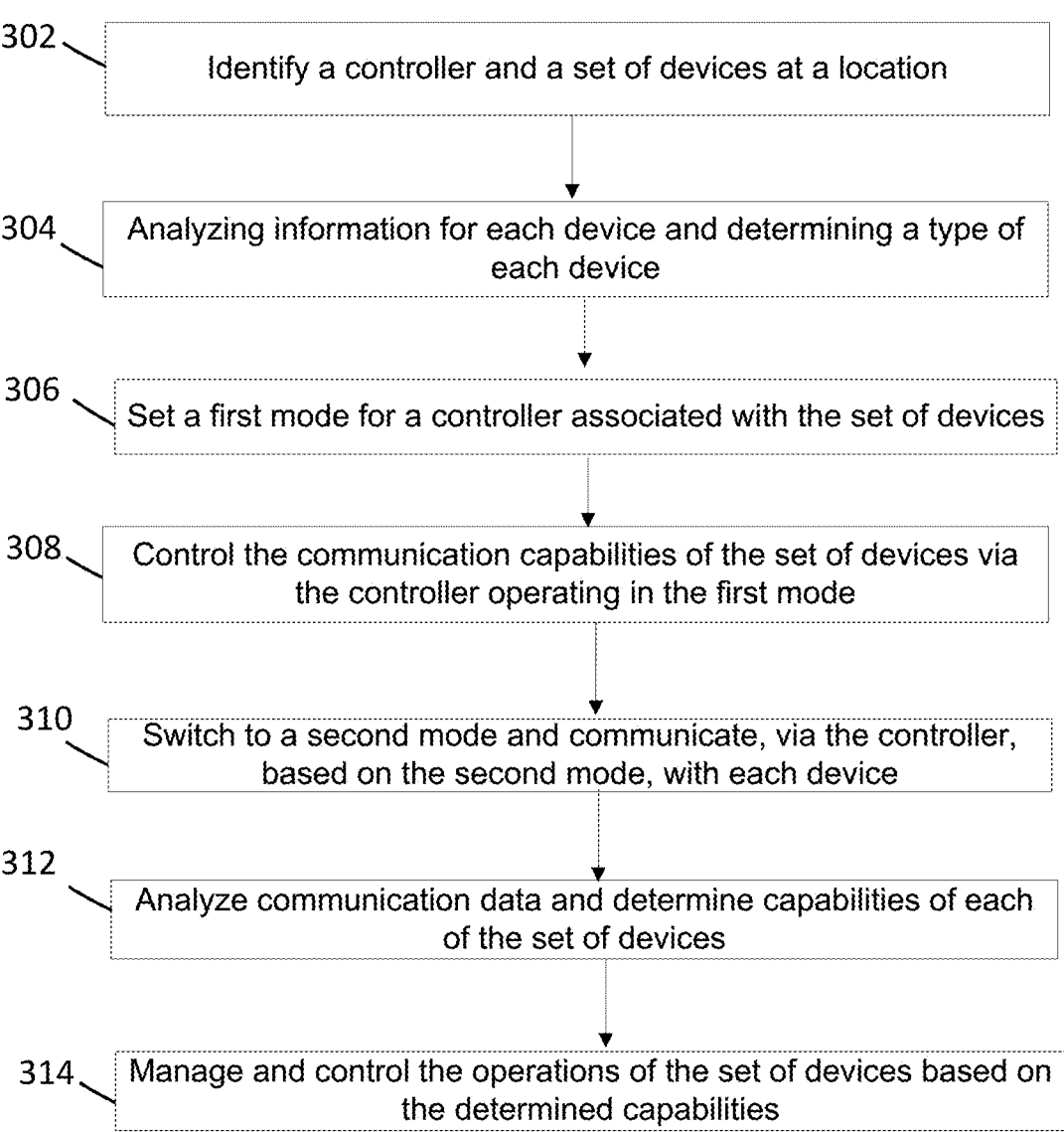

300

302 — Identify a controller and a set of devices at a location

304 — Analyzing information for each device and determining a type of each device 306 — Set a first mode for a controller associated with the set of devices 308 — Control the communication capabilities of the set of devices via the controller operating in the first mode 310 — Switch to a second mode and communicate, via the controller, based on the second mode, with each device 312 — Analyze communication data and determine capabilities of each of the set of devices 314 — Manage and control the operations of the set of devices based on the determined capabilities

FIG. 3

COMPUTERIZED SYSTEMS AND METHODS FOR PROVIDING DEVICE-SPECIFIC CONFIGURATIONS TO HOST-CLIENT DEVICES

RELATED APPLICATION(S)

This application claims priority to and the benefit of U.S. Provisional Patent Application No. 63/508,035, filed Jun. 14, 2023, the entire contents of which is incorporated herein by reference.

FIELD OF THE DISCLOSURE

The present disclosure is generally related to providing specific configurations and management by and between host-client devices, \more particularly, to programmatically configuring and controlling digital operations by and between the host-client devices at a location.

BACKGROUND

Conventional mechanisms for installing, updating and/or modifying capabilities of devices operating a location, especially those operating within and/or in line with a host-client relationship, involve a series of manual tasks that are prone to error and can cause an unnecessary significant expenditure in resources. Moreover, the cost associated with such operational tasks severely outweighs the benefits for a system upgrade.

SUMMARY OF THE DISCLOSURE

According to some embodiments, the disclosed systems and methods provide a novel operational framework that can automatically and dynamically manipulate, control and/or manage connected devices at a location so as to effectuate a location-based system to efficiently, properly and accurately operate. As discussed herein, the disclosed systems and methods can enable stream-lined operational capabilities for a controller device (e.g., a host, for example) to control and manage operational capabilities of connected devices, as well as provide updates, upgrades and/or other types of modifications that can enable non-native and/or modified functional characteristics to be provided to the location-based environment. Accordingly, the disclosed framework can enable improved mechanisms for how, and in which manner, a controller can implement computer-executable instructions and/or software operations at a location so that the client-based hardware operates accordingly.

According to some embodiments, for purposes of this disclosure, the referenced framework can be operational within any type of known or to be known network-based and/or network-configured system that can interact with other devices and/or provide event-based monitoring and action for a location. For example, the monitoring system can be a security system, climate system (e.g., heating, cooling and ventilation (HVAC), for example), and the like. Moreover, according to some embodiments, the monitoring system can effectuate any type of host-client and/or controller-end user relationship within any type of known or to be known Internet-of-Things (IoT) environment, such that the disclosed functionality can improve and/or enhance the capabilities in the manner such IoT devices can communicate, and which manner they do communicate, as discussed herein.

According to some embodiments, a location, as discussed herein, can be any type of definable geographic or physical area, such as, but not limited to, a building, structure, home, room, yard, patio, garage, and the like, or some combination thereof.

According to some embodiments, a method is disclosed for programmatically configuring and controlling digital operations by and between the host-client devices at a location. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for programmatically configuring and controlling digital operations by and between the host-client devices at a location.

In accordance with some embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 illustrates an exemplary workflow according to some embodiments of the present disclosure;

DETAILED DESCRIPTION

Figure 1:
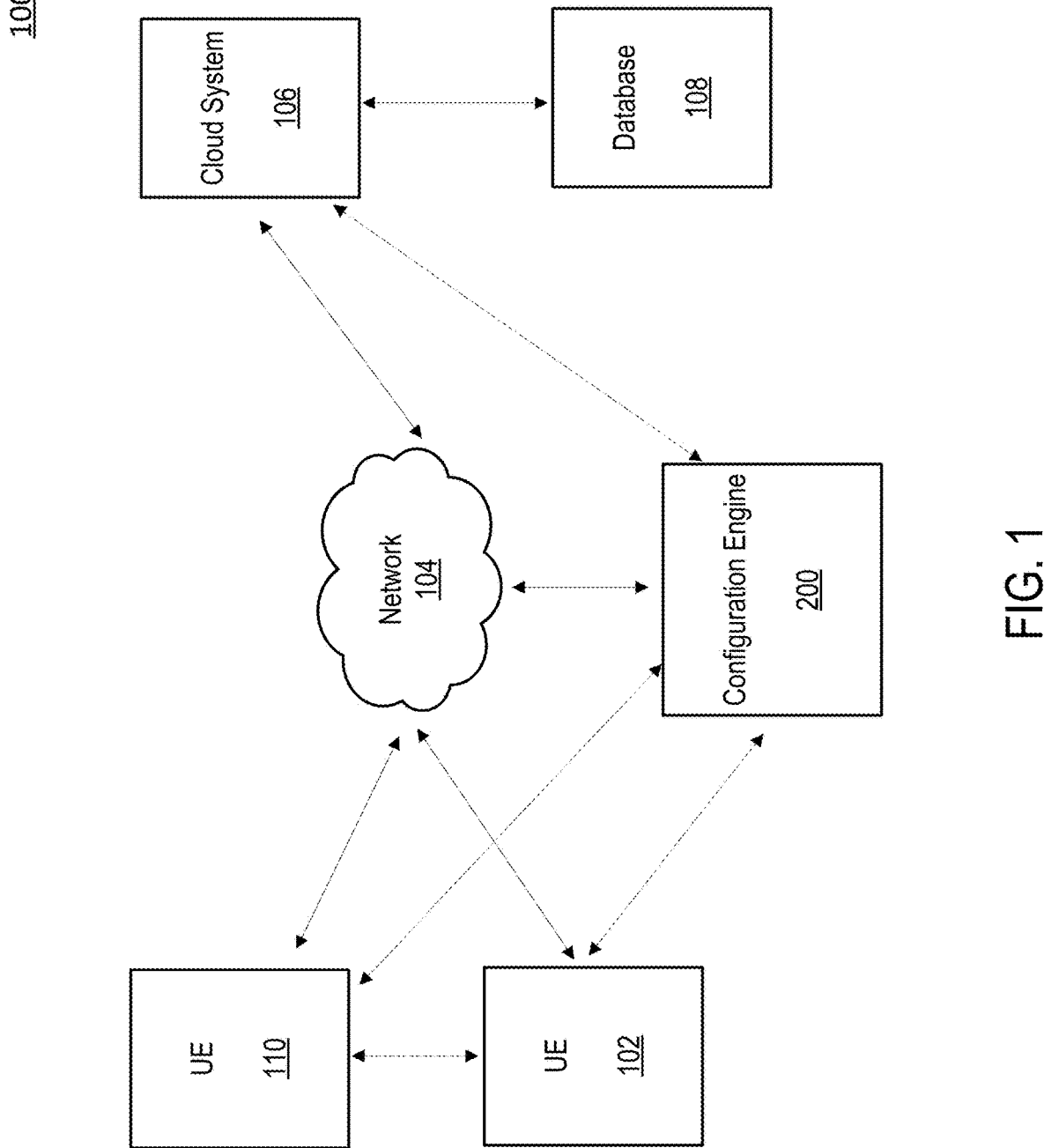
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a controller (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A controller device may vary in terms of capabilities or features. Claimed subject matter is intended to cover a wide range of potential variations, such as a web-enabled controller device or previously mentioned devices may include a high-resolution screen (HD or 4K for example), one or more physical or virtual keyboards, mass storage, one or more accelerometers, one or more gyroscopes, global positioning system (GPS), one or more testing sensors, or other communication type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes user equipment (UE) 102 and UE 110 (e.g., a controller device embodied as device 600, as discussed below at least in relation to FIG. 6), network 104, cloud system 106, database 108 and configuration engine 200. It should be understood that while system 100 is depicted as including such components, it should not be construed as limiting, as one of ordinary skill in the art would readily understand that varying numbers of UEs, peripheral devices, sensors, cloud systems, databases and networks can be utilized; however, for purposes of explanation, system 100 is discussed in relation to the example depiction in FIG. 1.

According to some embodiments, UEs 102 and 110 can be any type of device, such as, but not limited to, a mobile phone, tablet, laptop, sensor, Internet of Things (IoT) device, autonomous machine, and any other device equipped with a cellular or wireless or wired transceiver. In some embodiments, UEs 102 and 110 can be a device associated with an individual (or set of individuals) for which disclosed services are being provided. In some embodiments, UEs 102 and 110 may correspond to a device of a security provider, network provider, content provider, HVAC or climate-control related entity (e.g., a HVAC provider, whereby the device can be and/or can have corresponding sensors 110, as discussed herein), and the like.

In some embodiments, UE 102 can be a peripheral device that can be connected to UE 110 (or vice versa), and can be any type of peripheral device, such as, but not limited to, a wearable device (e.g., smart watch), printer, speaker, sensor, and the like. In some embodiments, another peripheral device (not shown) can be connected to UEs 102 and/or 110. In some embodiments, a peripheral device can be any type of device that is connectable to another device at the location via any type of known or to be known pairing mechanism, including, but not limited to, Bluetooth™, Bluetooth Low Energy (BLE), NFC, and the like.

According to some embodiments, UEs 102 and/or 110 can be a sensor that can be associated with a location of system 100. In some embodiments, such sensors can be, for example, but are not limited to, cameras, glass break detectors, motion detectors, door and window contacts, heat and smoke detectors, carbon monoxide ($CO_2$) detectors, passive infrared (PIR) sensors, time-of-flight (ToF) sensors, and the like. In some embodiments, the sensors can be associated with devices associated with the location of system 100, such as, for example, lights, smart locks, garage doors, smart appliances (e.g., thermostat, refrigerator, television, personal assistants (e.g., Alexa®, Nest®, for example)), smart phones, smart watches or other wearables, tablets, personal computers, and the like, and some combination thereof. Thus, the sensors can be, wholly or in part, part of an IoT sensor network. For example, the sensors can include the sensors on UE 102 and/or 110 (e.g., smart phone, a paired smart watch, and the like).

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a location monitoring and control system provider (e.g., Resideo®), which has associated network resources hosted on the internet or private network (e.g., network 104), which enables (via configuration engine 200) the temperature management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of UE 102/device 112 and the UE 102/device 112, sensors 110, and the services and applications provided by cloud system 106 and/or configuration engine 200.

In some embodiments, for example, cloud system 106 can provide a private/proprietary climate management platform, whereby configuration engine 200, discussed infra, corresponds to the novel functionality system 106 enables, hosts and provides to a network 104 and other devices/sensors/platforms operating thereon.

Figure 4:
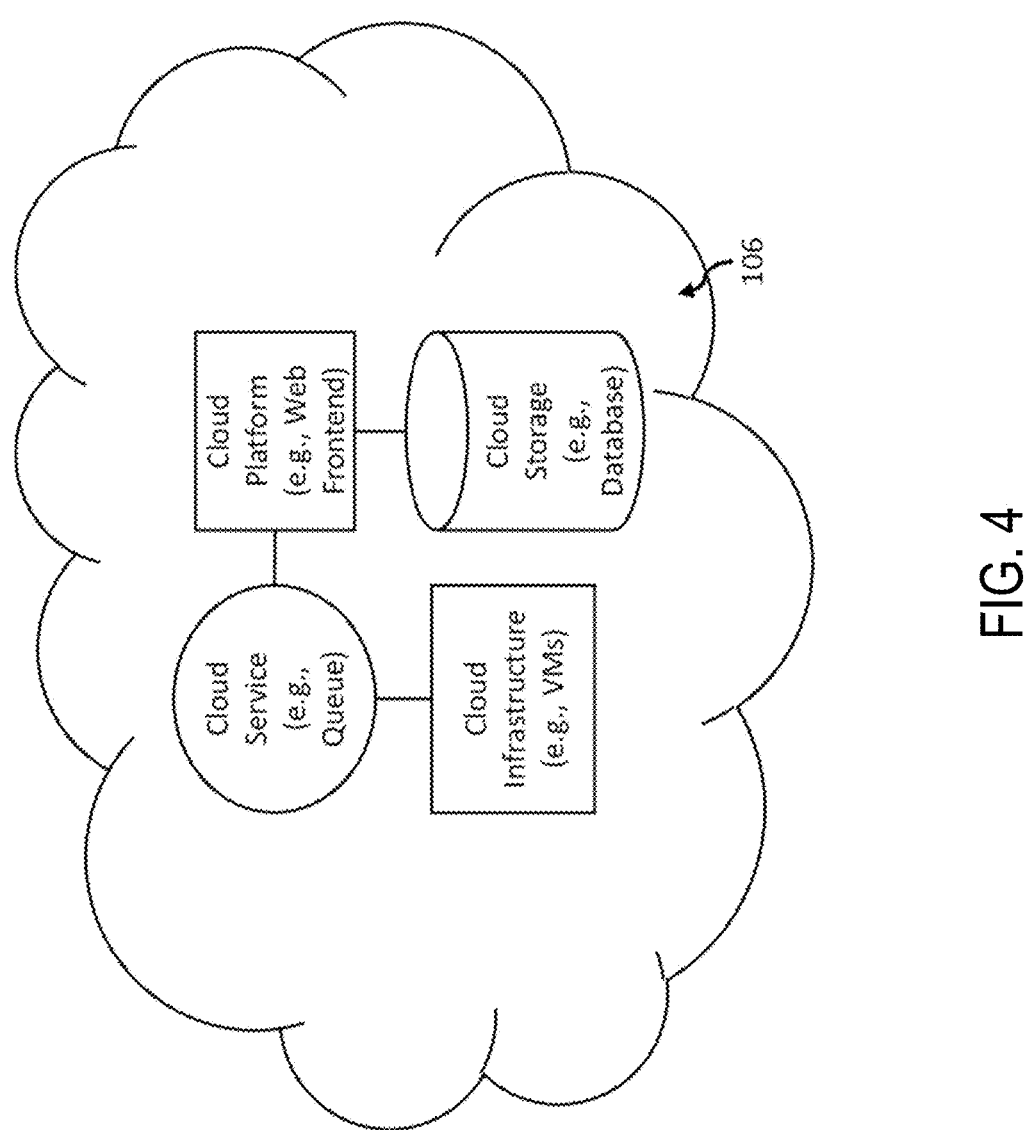
FIG. 4 depicts an exemplary implementation of an architecture according to some embodiments of the present disclosure.
Figure 5:
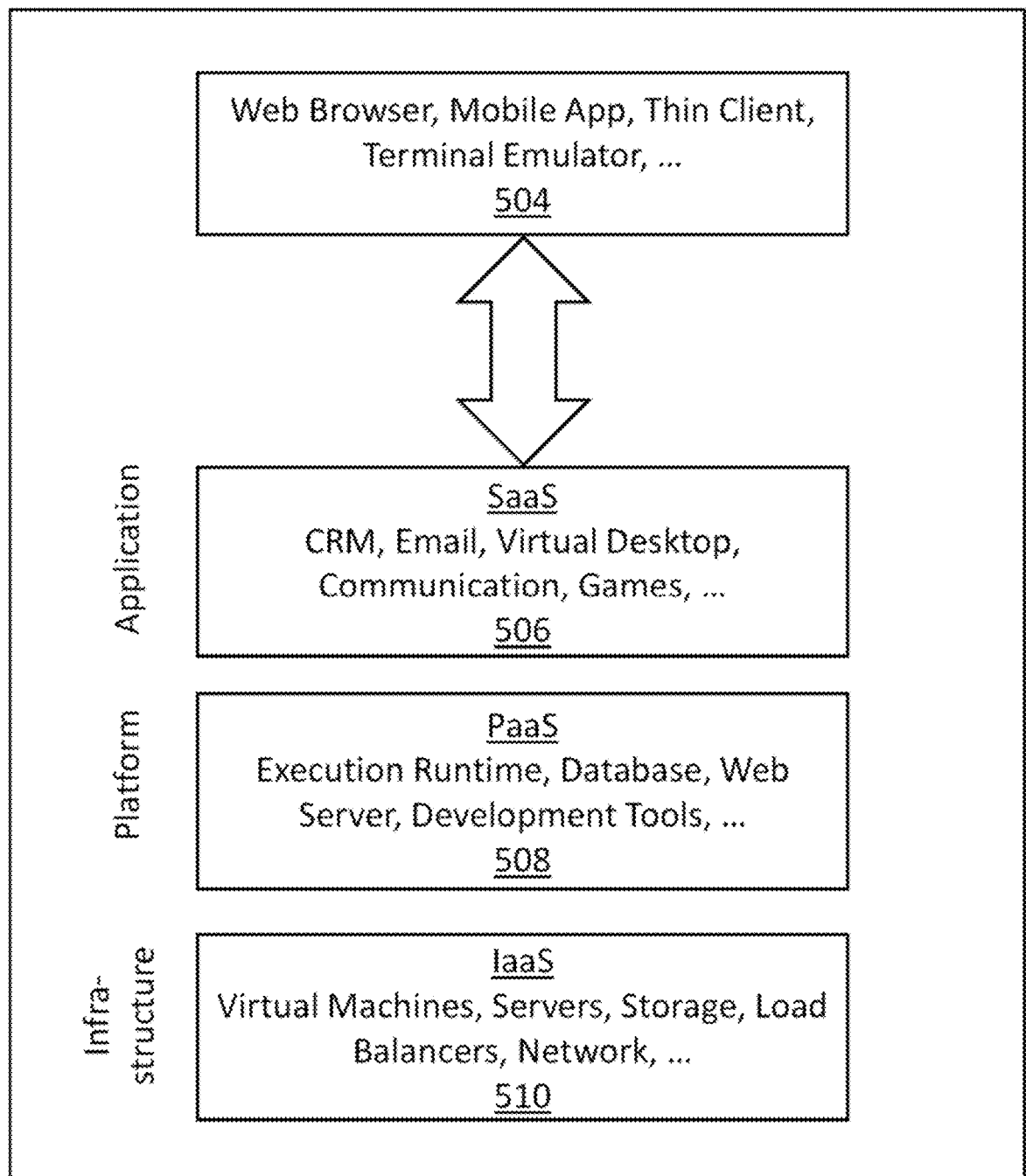
FIG. 5 depicts an exemplary implementation of an architecture according to some embodiments of the present disclosure.

Turning to FIG. 4 and FIG. 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure a service (IaaS) 510, platform as a service (PaaS) 508, and/or software as a service (SaaS) 506 using a web browser, mobile app, thin client, terminal emulator or other endpoint 504. FIG. 4 and FIG. 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra), a plurality of platforms, and/or UE 102 and/or sensors 110. Database 108 may receive storage instructions/requests from, for example, configuration engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Configuration engine 200, as discussed above and further below in more detail, can include components for the disclosed functionality. According to some embodiments, configuration engine 200 may be a special purpose machine or processor, and can be hosted by a device on network 104, within cloud system 106 and/or on UE 102 and/or UE 110. In some embodiments, the configuration engine 200 may be hosted by a server and/or set of servers associated with cloud system 106. In some embodiments, the configuration engine 200 may perform a plurality of actions associated with the UE 102 and/or UE 110, such as control the plurality of devices, monitor the plurality of devices, manage the plurality of devices, and/or modify the capabilities of the plurality of devices.

According to some embodiments, as discussed in more detail below, the configuration engine 200 may be configured to implement and/or control a plurality of services and/or microservices, where each of the plurality of services/microservices are configured to execute a plurality of workflows associated with performing the disclosed temperature management. Non-limiting embodiments of such workflows are provided below in relation to at least FIG. 3.

According to some embodiments, as discussed above, configuration engine 200 may function as an application provided by cloud system 106. In some embodiments, engine 200 may function as an application installed on a server(s), network location and/or other type of network resource associated with system 106. In some embodiments, engine 200 may function as an application installed and/or executing on UEs 102 and/or 110. In some embodiments, such application may be a web-based application accessed by UEs 102 and/or 110, and/or devices over network 104 from cloud system 106. In some embodiments, engine 200 may be configured and/or installed as an augmenting script, program or application (e.g., a plug-in or extension) to another application or program provided by cloud system 106 and/or executing on UEs 102 and/or 110.

Figure 2:
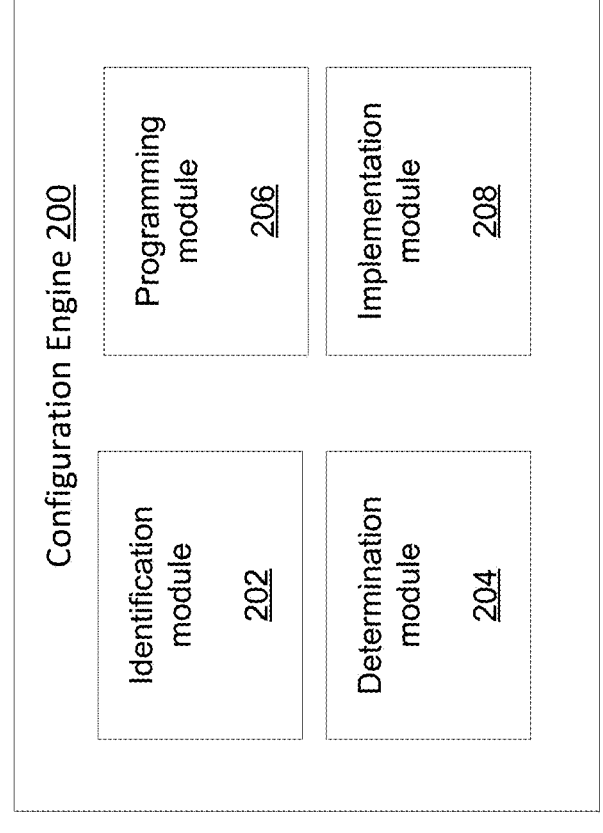
FIG. 2 is a block diagram illustrating components of an exemplary system according to some embodiments of the present disclosure.

As illustrated in FIG. 2, according to some embodiments, configuration engine 200 includes identification module 202, detection module 204, programming module 206 and implementation module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Turning to FIG. 3, provided is Process 300 which details non-limiting example embodiments for the disclosed host-client device management framework.

According to some embodiments, Step 302 of Process 300 can be performed by identification module 202 of configuration engine 200; Step 304 and Step 312 can be performed by determination module 204; Step 306 can be performed by programming module 206; and Step 308, Step 310 and Step 314 can be performed by implementation module 208.

According to some embodiments, Process 300 begins with Step 302 where engine 200 identifies a controller (e.g., controller device, also referred to as an associated controller, used interchangeably) and a set of devices at a location (for example, Step 302 can identify a controller associated with at least a portion of the set of devices). In some embodiments, the engine 200 may set a plurality of modes for the controller, where the controller is electronically connected to a set of devices at a particular period of time and capable of assisting a user with configuration of other devices, such as repair, maintenance, and/or communication capabilities. In some embodiments, the controller and/or set of devices may refer to UE 102, UE 110, and any additional device within the location and/or connected via cloud system 106. For example, with reference to FIG. 1, Step 302 can identify the controller and the set of devices within a residential and/or commercial location. In some embodiments, as discussed above, engine 200 can identify UE 102 as a host and UE 110 as a client. In some embodiments, UE 102 can be identified as a host device and UE 110 can be identified as a host device. In some embodiments, UE 102 can be identified as a client device and UE 110 can be identified as a host device.

In some embodiments, the devices identified may not have a specific configuration, in that, they may not be configured as a host or client device.

In some embodiments, Step 302 may involve pinging each device and/or collecting or identifying information related to each device based on setting the controller in a desired mode. Thus, in Step 304, engine 200 can analyze information for each device and determine a type of each device of the set of devices. In some embodiments, the information may refer to specifications associated with each device of the set of devices. In some embodiments, the analysis of information for each device may refer to a computational analysis associated with each device to determine the type of information processed by each device. For example, Step 302 may involve engine 200 identifying the controller to receive information related to the set of devices at a time period and determining that UE 102 and UE 110 are a type of device configured as host devices (e.g., they are currently programmed to accept binding requests from other devices that are operating as a client at the location).

According to some embodiments, such computational analysis and determination may involve parsing the device information, deriving, determining, detecting, extracting or otherwise identifying the communication capabilities of the device therefrom. In some embodiments, such analysis can be performed via any type of known or to be known computational analysis technique, algorithm, mechanism or technology. In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the device data, as discussed herein.

According to some embodiments and, optionally, in combination of any embodiment described above or below, a neural network technique may be one of, without limitation, a feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model, b transfer the input data to the neural network model, c. train the model incrementally, d. determine the accuracy for a specific number of timesteps, e. apply the trained model to process the newly-received input data, f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Thus, as a result of Step 304, engine 200 can analyze information for each device and determine the type of each device based on the analysis of information. For example, the engine 200 can analyze and determine that a thermostat capable of controlling the HVAC unit of a property is at the location. Thus, as discussed herein, engine 200 can identify the controller that is electronically connected to the set of devices at the location and at the time period (in Step 302) and analyze information associated with the controller and determine the type of device each of the set of devices based on the analysis (in Step 304).

In some embodiments, the engine 200 may detect information indicating modification to at least a portion of the devices. In some embodiments, such detection can involve the use of an AI/ML model, as discussed above, to identify a plurality of activities performed respective to the portion of devices during the time period and perform computational analysis to determine that a modification in communication capabilities has occurred. In some embodiments, engine 200 can define or identify a type of programming data structure associated with the detected information that includes executable instructions that when installed and executed on a controller/device can cause the device to operate in a modified (or non-native) manner or in an alternative mode.

In Step 306, engine 200 can set a first mode for a controller associated with the set of devices. In some embodiments, the first mode may refer to a mode that allows the configuration of the controller to behave in a predetermined manner. For example, the first mode for the controller may be a replacement mode and/or a repair mode. In some embodiments, the engine 200 can set the first mode for the controller in response to the analysis of information of the set of devices. In some embodiments, the engine 200 can set the first mode for the controller based on the determination that the set of devices at the location require maintenance.

According to some embodiments, Step 306 can involve setting the controller in a predetermined mode of operation to determine a modification and/or how it operates within the monitoring environment of the location. For example, the controller is set to the first mode to operate as a client (to the host of the UE 102).

In some embodiments, the controller may actively be configured to operate in a "replacement mode". This mode can allow the replacement of a plurality of features to the set of devices, thereby providing functionality for active communication capabilities with the set of devices. In some embodiments, the controller may control a plurality of communication capabilities of the set of devices via operation within the first mode. In some embodiments, the control of the communication capabilities may refer to programming/testing that can involve configurations where the controller is caused to pause, halt and/or modify the communication capabilities of the set of devices.

Thus, in Step 308, based on the setting of the first mode in Step 306, the communication capabilities of the set of devices are controlled via the controller. As mentioned above, such control functionality can involve being able to prevent communication and/or test communication capabilities with different types of devices within the set of devices. In some embodiments, Step 308 can involve controlling the communication capabilities of the set of devices to allow the controller to subsequently test the communication capabilities while being in the first mode in Step 306.

In some embodiments, engine 200 can properly disable communication capabilities of the controller device to replace a plurality of items associated with the device and detect information that indicates a modification in communication capabilities associated with the plurality of devices. For example, the device can be programmed and/or automatically enter a first mode to temporarily silence any signals and notifications associated with the set of devices during the time period. In some embodiments, the control of communication capabilities may refer to detectable information related to the devices at the time period. In some embodiments, such detectable information can include, but is not limited to, a device type, operational capabilities, date of programming (e.g., as a host or client), position within a location (e.g., on the wall, ceiling, and the like), objectives (e.g., what type of monitoring is the device used for—for example, security, climate control, and the like), and the like, or some combination thereof.

In some embodiments, capabilities that can be controlled can include, but are not limited to, how the device processes and/or communities signals, how the device stores information, how the device connects to other devices, which network interfaces the device uses, how the device operates to collect data related to the location, in which capacity the device operates (e.g., what type of device is it (e.g., which type of sensor and which type of data is it to collect, for example), and the like, or some combination thereof. In some embodiments, the device identifier may be altered so as to indicate a modified operational status. In some embodiments, programming and/or testing of the device may involve erasing the previously stored software on the device and/or overwriting such software with the programmable/ testable instructions that enable such modified operation. In some embodiments, only a portion of the operational capabilities being modified may be overwritten.

For example, the controller (e.g., UE 110, for example), may initially be operational as a host device; however, via the programed modification in Steps 306-308, the controller can operate as a client device (e.g., a sensor to collect temperature data at the location). Therefore, rather than operating to prevent communications from other client devices (e.g., as a host), the controller can operate as a test device to perform communication capability testing with other host devices, and after such communication capabilities are tested (as discussed herein), cause a plurality of interaction between the controller and each of the portion of devices.

In Step 310, engine 200 can switch to a second mode and communicate with each device of the set of devices via the controller. In some embodiments, the second mode may refer to exiting the first mode and/or a binding mode, where the binding mode allows the controller to perform programming and/or testing of communication capabilities on the set of devices. For example, with reference to FIG. 1, engine 200 switches the mode of the controller to test and communicate with UE 102 and UE 110. Thus, in Step 310, the interactions between the controller and each device in the set of devices involve executing the communication capabilities and determining the communication capabilities of the set of devices, where communication data is a result of the testing and communication between the controller and the set of devices in response to the control switching from the first mode to the second mode. In some embodiments, the engine 200 may alter operational state of the controller (e.g., exit replacement mode) from a host state to a client state, whereby the client state corresponds to a different mode of operation (e.g., binding mode-communicate and test communication capabilities of host devices).

In some embodiments, the communication in Step 310 can be based on the modification of operational status associated with the controller and any rest of testing the communication capabilities of the set of devices. That is, for example, the controller is operating in a modified state as in replacement mode; therefore, the other device(s) may be prevented from communicating with the controller to allow the test to proceed. Conversely, if the controller is in the second mode as an exit replacement mode, then the other devices may be able to interact with the controller via communication capabilities. Thus, Step 310 can enable the interactions between the controller and the set of devices so as to execute the communication capabilities of the set of devices and determine communication data of each device of the set of devices.

In Step 312, the engine 200 may analyze the communication data that was the result of Step 310 and determine communication capabilities of each device of the set of devices. In some embodiments and similar to Step 304, discussed supra, the engine 200 may utilize the AI/ML algorithms to analyze the communication data associated with the testing of the set of devices by the controller. In some embodiments, the engine 200 may utilize the AI/ML algorithms to determine the results of the testing of communication capabilities of the set of devices to determine the current communication capabilities of each device of the set of devices based on the controller switching from the first mode to the second mode. In some embodiments, the engine 200 may cause a plurality of interactions to occur between the controller and at least a portion of the set of devices. For example, the engine 200 may determine that the UE 102 may communicate with the controller once switching from the first mode to the second mode, but UE 110 was unable to communicate with the controller in the second mode. Thus, in such example, the communication data provides additional information that can facilitate an update or modification to the communication capabilities of UE 110 enabling such communication.

In Step 314, the engine 200 may manage and control a plurality of operations of the set of devices. In some embodiments, the engine 200 may manage and control the plurality of operations and interactions that occur between the controller and each device of the set of devices based on the current determined capabilities as shown in Step 312. In some embodiments, the management and control of the plurality of operations of the set of devices may refer to the controller allowing (e.g., enabling and/or providing read/ write access to) at least one device of the set of devices to communicate with another device of the set of devices. In another non-limiting embodiment, the management and control of the plurality of operations may refer to the controller preventing at least one device from communicating with another device of the set of devices.

Figure 6:
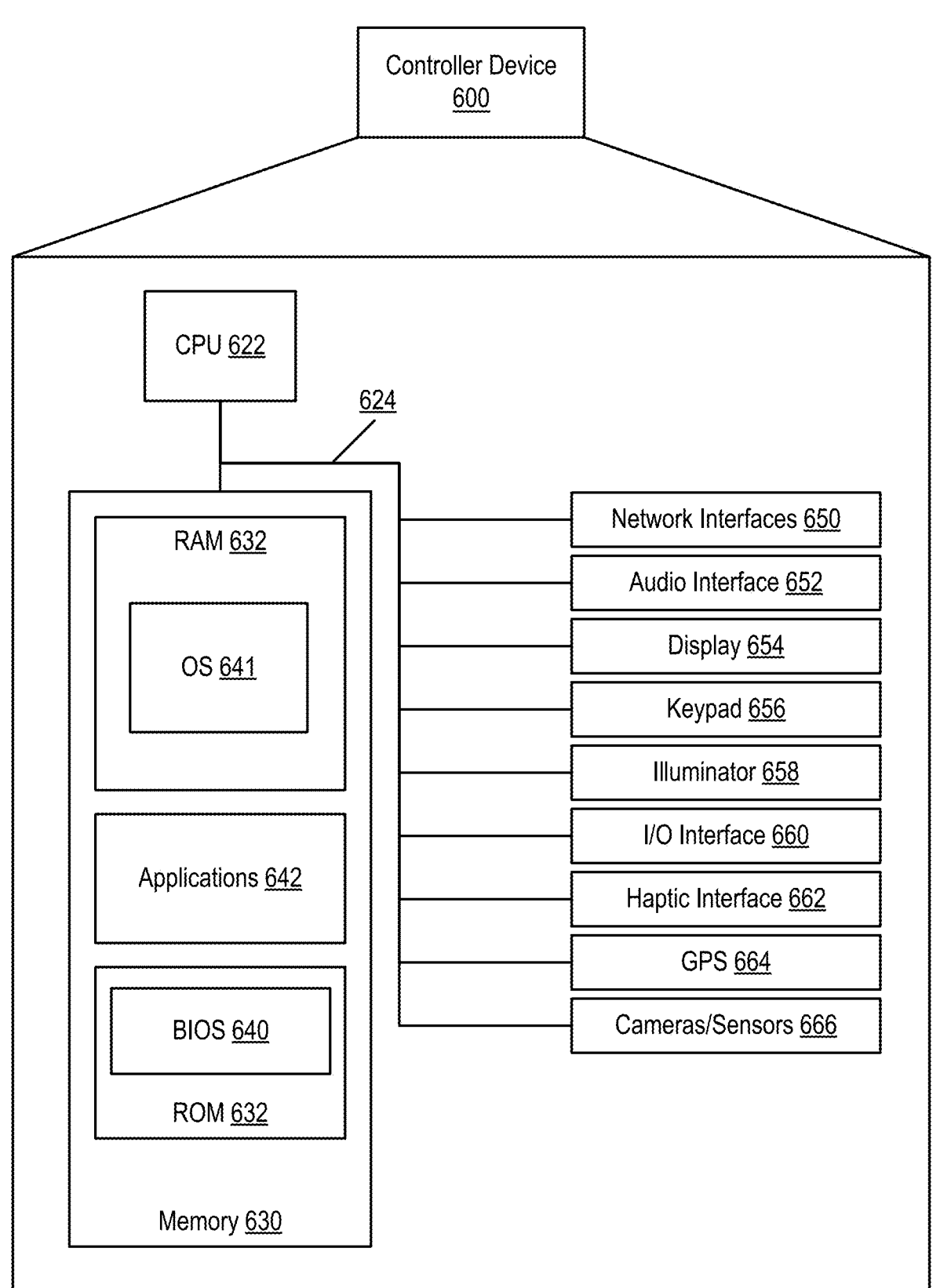
FIG. 6 is a block diagram illustrating a computing device showing an example of a client or server device used in various embodiments of the present disclosure.

FIG. 6 is a schematic diagram illustrating a controller device showing an example embodiment of a client device that may be used within the present disclosure. Controller device 600 may include many more or less components than those shown in FIG. 6. However, the components shown are sufficient to disclose an illustrative embodiment for implementing the present disclosure. Controller device 600 may represent, for example, UE 102 discussed above at least in relation to FIG. 1.

As shown in the figure, in some embodiments, controller device 600 includes a processing unit (CPU) 622 in communication with a mass memory 630 via a bus 624. Controller device 600 also includes a power supply 626, one or more network interfaces 650, an audio interface 652, a display 654, a keypad 656, an illuminator 658, an input/ output interface 660, a haptic interface 662, an optional global positioning systems (GPS) receiver 664 and a camera (s) or other optical, thermal or electromagnetic sensors 666. Device 600 can include one camera/sensor 666, or a plurality of cameras/sensors 666, as understood by those of skill in the art. Power supply 626 provides power to Controller device 600.

Controller device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Controller device 600 also includes input/output interface 660 for communicating with external. Input/output interface 660 can utilize one or more communication technologies, such as USB, infrared, Bluetooth™M, or the like in some embodiments. Haptic interface 662 is arranged to provide tactile feedback to a user of the client device.

Optional GPS transceiver 664 can determine the physical coordinates of Controller device 600 on the surface of the Earth, which typically outputs a location as latitude and longitude values. GPS transceiver 664 can also employ other geo-positioning mechanisms, including, but not limited to, triangulation, assisted GPS (AGPS), E-OTD, CI, SAI, ETA, BSS or the like, to further determine the physical location of client device 600 on the surface of the Earth. In one embodiment, however, Controller device 600 may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Controller device 600. The mass memory also stores an operating system 641 for controlling the operation of Client device 600.

Memory 630 further includes one or more data stores, which can be utilized by Controller device 600 to store, among other things, applications 642 and/or other information or data. For example, data stores may be employed to store information that describes various capabilities of Controller device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Controller device 600.

Applications 642 may include computer executable instructions which, when executed by Controller device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
setting, by a processor, a first mode for an associated controller, the controller electronically connected to a set of devices at a location, the first mode corresponding to a time period;
disabling, by the processor, based on the first mode, communication capabilities of the controller with the each of the set of devices for the time period;
detecting, by the processor, information indicating modification to at least a portion of the devices, the detected information being based on activities performed respective to the portion of the devices during the time period;
modifying, by the processor, based on the detected information, operation of the controller, the modified operation comprising changing from the first mode to a second mode, the second mode enabling capabilities for the controller to test capabilities of at least the portion of devices; and
causing, by the processor, interactions between the controller and each of the portion of devices in accordance with the second mode, the interactions involving executing the capabilities of the portion of devices and determining each capabilities status.

2. The method of claim 1, further comprising:
controlling the electronic connection between the controller and the portion of the devices based on the status determinations from the interactions.

3. The method of claim 1, wherein the capabilities correspond to at least one of status, battery strength, signal strength, signal notifications, signal delivery, RSSI levels and location coverage.

4. The method of claim 1, wherein the second mode corresponds to testing capabilities of each of the set of devices, wherein the interactions correspond to each of the set of devices.

5. The method of claim 1, further comprising:
receiving, via an application executing in association with the controller, input corresponding to the first mode, wherein the setting of the first mode is based on the received input.

6. The method of claim 1, wherein the first mode corresponds to a replacement mode for the devices connected to the controller.

7. The method of claim 1, wherein the second mode corresponds to a test mode for the devices connected to the controller.

8. A device comprising:
a processor configured to:
set a first mode for an associated controller, the controller electronically connected to a set of devices at a location, the first mode corresponding to a time period;
disable, based on the first mode, communication capabilities of the controller with the each of the set of devices for the time period;
detect information indicating modification to at least a portion of the devices, the detected information being based on activities performed respective to the portion of the devices during the time period;
modify, based on the detected information, operation of the controller, the modified operation comprising changing from the first mode to a second mode, the second mode enabling capabilities for the controller to test capabilities of at least the portion of devices; and
cause interactions between the controller and each of the portion of devices in accordance with the second mode, the interactions involving executing the capabilities of the portion of devices and determining each capabilities status.

9. The device of claim 8, wherein the processor is further configured to:
control the electronic connection between the controller and the portion of the devices based on the status determinations from the interactions.

10. The device of claim 8, wherein the capabilities correspond to at least one of status, battery strength, signal strength, signal notifications, signal delivery, RSSI levels and location coverage.

11. The device of claim 8, wherein the second mode corresponds to testing capabilities of each of the set of devices, wherein the interactions correspond to each of the set of devices.

12. The device of claim 8, wherein the processor is further configured to:

receive, via an application executing in association with the controller, input corresponding to the first mode, wherein the setting of the first mode is based on the received input.

13. The device of claim 8, wherein the first mode corresponds to a replacement mode for the devices connected to the controller.

14. The device of claim 8, wherein the second mode corresponds to a test mode for the devices connected to the controller.

15. A non-transitory computer-readable storage medium tangibly encoded with computer-executable instructions that when executed by a processor, perform a method comprising:

setting, by the processor, a first mode for an associated controller, the controller electronically connected to a set of devices at a location, the first mode corresponding to a time period;

disabling, by the processor, based on the first mode, communication capabilities of the controller with the each of the set of devices for the time period;

detecting, by the processor, information indicating modification to at least a portion of the devices, the detected information being based on activities performed respective to the portion of the devices during the time period;

modifying, by the processor, based on the detected information, operation of the controller, the modified operation comprising changing from the first mode to a second mode, the second mode enabling capabilities for the controller to test capabilities of at least the portion of devices; and causing, by the processor, interactions between the controller and each of the portion of devices in accordance with the second mode, the interactions involving executing the capabilities of the portion of devices and determining each capabilities status.

16. The non-transitory computer-readable storage medium of claim 15, further comprising:

controlling the electronic connection between the controller and the portion of the devices based on the status determinations from the interactions.

17. The non-transitory computer-readable storage medium of claim 15, wherein the capabilities correspond to at least one of status, battery strength, signal strength, signal notifications, signal delivery, RSSI levels and location coverage.

18. The non-transitory computer-readable storage medium of claim 15, wherein the second mode corresponds to testing capabilities of each of the set of devices, wherein the interactions correspond to each of the set of devices.

19. The non-transitory computer-readable storage medium of claim 15, further comprising:

receiving, via an application executing in association with the controller, input corresponding to the first mode, wherein the setting of the first mode is based on the received input.

20. The non-transitory computer-readable storage medium of claim 15, wherein the first mode corresponds to a replacement mode for the devices connected to the controller.

* * * * *